(12) United States Patent
Naskar et al.

(10) Patent No.: US 8,748,537 B2
(45) Date of Patent: Jun. 10, 2014

(54) LIGNIN-DERIVED THERMOPLASTIC CO-POLYMERS AND METHODS OF PREPARATION

(71) Applicant: UT-Battelle, LLC, Oak Ridge, TN (US)

(72) Inventors: Amit K. Naskar, Knoxville, TN (US); Tomonori Saito, Knoxville, TN (US); Joseph M. Pickel, Knoxville, TN (US); Frederick S. Baker, Oak Ridge, TN (US); Claude Clifford Eberle, Knoxville, TN (US); Robert E. Norris, Knoxville, TN (US); Jonathan Richard Mielenz, Rockwood, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/058,657

(22) Filed: Oct. 21, 2013

(65) Prior Publication Data
US 2014/0045996 A1    Feb. 13, 2014

Related U.S. Application Data

(62) Division of application No. 13/288,360, filed on Nov. 3, 2011.

(51) Int. Cl.
*C08G 65/40* (2006.01)
*C08F 8/00* (2006.01)

(52) U.S. Cl.
USPC ........... 525/152; 527/400; 524/73; 524/74

(58) Field of Classification Search
CPC .................................. C08F 8/00; C08F 65/40
USPC .................... 524/74, 73; 525/152; 527/400
See application file for complete search history.

(56) References Cited

U.S. PATENT DOCUMENTS

| | | | |
|---|---|---|---|
| 3,470,148 A | | 9/1969 | Allan |
| 3,600,308 A | | 8/1971 | Allan |
| 3,912,706 A | * | 10/1975 | Rachor et al. ............... 527/403 |
| 4,168,371 A | * | 9/1979 | Brown ....................... 528/482 |
| 8,383,784 B2 | | 2/2013 | Park et al. |
| 2013/0116383 A1 | | 5/2013 | Naskar et al. |

OTHER PUBLICATIONS

Braun J.L. et al., "Lignin-Based Carbon Fibers: Oxidative Thermostabilization of Kraft Lignin", Carbon 43:385-384 (2005).
Kubo S. et al., "Lignin-Based Carbon Fibers: Effect of Synthetic Polymer Blending on Fiber Properties", Journal of Polymers and the Environment 13(2):97-105 (Apr. 2005).
Milstein O. et al., "Enzymatic Co-Polymerization of Lignin With Low-Molecular Mass Compounds", Applied Microbiology and Biotechnology 40:760-767 (1994).
Final Official Action dated Jul. 9, 2013 in a related application, namely, U.S. Appl. No. 13/288,360.
Official Action dated Jan. 29, 2013 in a related application, namely, U.S. Appl. No. 13/288,360.

* cited by examiner

*Primary Examiner* — William Cheung
(74) *Attorney, Agent, or Firm* — Scully, Scott, Murphy & Presser, P.C.

(57) ABSTRACT

The present invention relates to a crosslinked lignin comprising a lignin structure having methylene or ethylene linking groups therein crosslinking between phenyl ring carbon atoms, wherein said crosslinked lignin is crosslinked to an extent that it has a number-average molecular weight of at least 10,000 g/mol, is melt-processible, and has either a glass transition temperature of at least 100° C., or is substantially soluble in a polar organic solvent or aqueous alkaline solution. Thermoplastic copolymers containing the crosslinked lignin are also described. Methods for producing the crosslinked lignin and thermoplastic copolymers are also described.

33 Claims, 3 Drawing Sheets

LIGNIN-DERIVED THERMOPLASTIC CO-POLYMERS AND METHODS OF PREPARATION

CROSS REFERENCE TO RELATED APPLICATIONS

This application is a divisional of U.S. application Ser. No. 13/288,360 filed on Nov. 3, 2011, the contents of which are incorporated herein by reference in their entirety.

This invention was made with government support under Prime Contract No. DE-AC05-00OR22725 awarded by the U.S. Department of Energy. The government has certain rights in the invention.

FIELD OF THE INVENTION

The present invention relates generally to thermoplastic biopolymers, and more particularly, to such polymers in which lignin is incorporated.

BACKGROUND OF THE INVENTION

Lignin, a complex O-methyl-substituted polyphenol found in lignocellulosic biomass, is the third most abundant natural polymer (after cellulose and chitin, respectively) that accounts for up to 30% by weight of wood. Lignin is a valuable by-product of the pulp and paper industry produced in quantities exceeding 200 million metric tons annually, but the vast majority of this by-product (>99%) is not isolated but combusted in the form of "black liquor" to meet the energy needs of the mill. Future and upcoming biorefineries that process lignocellulosic materials for the production of fuel and commodity products (e.g., ethanol or liquid alkanes) are also expected to produce lignin in large amounts as a byproduct.

Significant commercial potential exists in the conversion of lignin to high-value end products (i.e., functional materials), but lignin remains a highly difficult and challenging material to convert into such useful products. Although functional plastic materials have been produced from lignin, these materials are generally highly-crosslinked thermosets, which are not melt-processible (and hence, not recyclable). Furthermore, due to their rigid and brittle character, the known lignin-containing plastics generally lack the rubber elasticity, strength, and toughness required for use in many industrial and commercial applications (e.g., automobile interior or exterior materials). Moreover, the known lignin-containing plastics are generally not amenable for being adjusted or fine-tuned in such characteristics as glass transition temperature ($T_g$), degree of stiffness (i.e., rigidity), ductility, tensile failure strength, and toughness, thereby significantly limiting their range of applications.

SUMMARY OF THE INVENTION

The instant invention is directed to high performance lignin-based thermoplastics (thermoplastic copolymers) useful as industrial plastic resins and commercial materials for a number of applications. The thermoplastic copolymer described herein includes crosslinked lignin copolymerized with non-lignin thermoplastic polymer segments. By the integration of crosslinked lignin and non-lignin thermoplastic components, a lignin-based thermoplastic with a combination of advantageous properties has herein been achieved. The resulting thermoplastic material generally exhibits a multi-phase (e.g., two-phase or three-phase) morphology. For a special case when lignin and non-lignin components are thermodynamically miscible, the resulting thermoplastic material generally exhibits a substantially homogeneous morphology.

The lignin-based thermoplastics described herein are characterized by significant strength, durability, and ruggedness, while at the same time having a sufficient degree of moldability, elasticity, and/or ductility to make them integratable into a number of different applications. Furthermore, by the methods described herein for their manufacture, a wide range of different lignin-based thermoplastics differing in mechanical properties can be produced. Thus, a particularly advantageous aspect of the instant invention is the ability, by methods describe herein, to carefully adjust and fine-tune any of a variety of characteristics of the thermoplastic. In particular aspects, careful selection of the crosslinked lignin component, the non-lignin thermoplastic component, and the molar ratio used, and other variables, can be used for adjusting the characteristics of the final thermoplastic material.

In preferred embodiments, the lignin-based thermoplastic is produced by a method in which a crosslinked lignin is reacted with non-lignin thermoplastic polymer segments containing lignin-reactive groups thereon. By the method, crosslinked lignin units are covalently linked with non-lignin thermoplastic polymer segments.

The invention is also directed to the crosslinked lignin used for producing the thermoplastic copolymer. The crosslinked lignin described herein has a lignin structure in which methylene and/or ethylene linking groups crosslink phenyl ring carbon atoms. Significantly, by virtue of the mild crosslinking conditions used in processes described herein for producing the crosslinked lignin, the crosslinked lignin described herein is substantially less crosslinked than crosslinked lignins of the art. This substantially reduced amount of crosslinking renders the crosslinked lignin melt-processible, even when the crosslinked lignin possesses a number-average or weight-average molecular weight of at least 10,000 g/mol or a significantly higher weight. Moreover, the melt-processible crosslinked lignin described herein is generally characterized by a glass transition temperature of at least 100° C., and/or substantial or complete solubility in a polar organic solvent or aqueous alkaline solution. Solvation of crosslinked lignin into the non-lignin component of the copolymer significantly enhances melt-processibility of the product.

In preferred embodiments, the crosslinked lignin is produced by a method in which a precursor lignin having a number-average molecular weight of up to or less than 10,000 g/mol is reacted with an aqueous solution containing up to or less than 10 weight percent formaldehyde and/or glyoxal under condensation conditions. The resulting crosslinked lignin includes methylene and/or ethylene linking groups crosslinking between phenyl ring carbon atoms, and possesses the physical characteristics and properties described above.

DETAILED DESCRIPTION OF THE INVENTION

In a first aspect, the invention is directed to a crosslinked lignin that is melt-processible or amenable to melt-processing. By being "crosslinked" is meant that the lignin contains methylene (i.e., —CH$_2$—) and/or ethylene (i.e., —CH$_2$CH$_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent.

The crosslinked lignin is crosslinked to an extent that it has a number-average or weight-average molecular weight (i.e., M$_n$ or M$_w$, respectively) of at least 10,000 g/mol. In different embodiments, the crosslinked lignin has a number-average or weight-average molecular weight of precisely, about, at least, or greater than, for example, 10,000 g/mol, 25,000 g/mol, 50,000 g/mol, 75,000 g/mol, 100,000 g/mol, 125,000 g/mol, 150,000 g/mol, 175,000 g/mol, or 200,000 g/mol, or a molecular weight within a range bounded by any two of the foregoing exemplary values.

The glass transition temperature (T$_g$) of the crosslinked lignin is generally above room temperature (typically, 15, 20, 25, or 30° C.). In different embodiments, the crosslinked lignin has a glass transition temperature of precisely, about, at least, or greater than 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., 240° C., or 250° C., or a T$_g$ within a range bounded by any two of the foregoing values.

As used herein, the term "about" generally indicates within ±0.5%, 1%, 2%, 5%, or up to ±10% of the indicated value. For example, a molecular weight of about 10,000 g/mol generally indicates, in its broadest sense, 10,000 g/mol±10%, which indicates 9,000-11,000 g/mol. In addition, the term "about" can indicate either a measurement error (i.e., by limitations in the measurement method), or alternatively, a variation or average in a physical characteristic of a group (e.g., a variation in molecular weights).

The crosslinked lignin is preferably substantially soluble in a polar organic solvent or aqueous alkaline solution. As used herein, the term "substantially soluble" generally indicates that at least 1, 2, 5, 10, 20, 30, 40, or 50 grams of the crosslinked lignin completely dissolves in 1 deciliter (100 mL) of the polar organic solvent or aqueous alkaline solution. In other embodiments, the solubility is expressed as a wt % of the crosslinked lignin in solution. In particular embodiments, the crosslinked lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, one or more classes or specific types of solvents are excluded.

The invention is also directed to a composition in which the crosslinked lignin is dissolved in one or a combination of an organic solvent or aqueous alkaline solution. The resulting composition is a solution of the crosslinked lignin in a suitable solvent or solvent mixture. Additional ingredients may also be included, such as to prevent degradation or bacterial growth during storage or use.

In another aspect, the invention is directed to a method for producing the crosslinked lignin described above. In the method, a precursor lignin is treated, under condensation conditions, with an aqueous solution containing formaldehyde and/or glyoxal at a substantially lower concentration than conventionally practiced in the art. In different embodiments, the low concentration of formaldehyde and/or glyoxal used in the reaction is precisely, about, up to, or less than, for example, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt % relative to total volume or weight of the reaction contents, or a concentration within a range bounded by any two of these exemplary values. Such mild concentrations of formaldehyde and/or glyoxal can be achieved by appropriate dilution of an initial solution of formaldehyde and/or glyoxal of any concentration. Typically, the initial solution of formaldehyde and/or glyoxal before dilution is no more than 5 wt %, 10 wt %, 20 wt %, or 30 wt %. The term "condensation conditions" refer to those conditions, generally known in the art, that cause aldehydic and phenolic groups to crosslink. Generally, an elevated temperature in the presence of a base or acid catalyst is used for sufficient time to cause substantial crosslinking. In different embodiments, the elevated temperature can be, for example, about, at least, or above 50° C., 60° C., 70° C., 80° C., 90° C., or 100° C., sustained for a period of, for example, 30, 45, 60, 90, 120, 150, 180, 210, 240, 270, 300, 330, 360, 390, or 420 minutes, wherein it is understood that, generally, higher temperatures require less time to achieve the same or similar amount of crosslinking.

In the method for producing the crosslinked lignin, the aldehyde-containing species (typically, formaldehyde and/or glyoxal) is preferably in a mole ratio to lignin phenolic groups (i.e., F/P ratio) of at least 1:1 and up to 1:200. In different embodiments, the F/P ratio is precisely, about, or at least, for example, 1:1, 1:2, 1:3, 1:4, 1:5, 1:10, 1:20, 1:30, 1:40, 1:50, 1:60, 1:70, 1:80, 1:90, 1:100, 1:120, 1:150, or 1:200, or a F/P ratio within a range bounded by any two of the foregoing values.

The precursor lignin preferably has a number-average or weight-average molecular weight of up to or less than 10,000 g/mol. In different embodiments, the precursor lignin has a molecular weight of up to or less than, for example, 10,000 g/mol, 9,500 g/mol, 9,000 g/mol, 8,500 g/mol, 8,000 g/mol, 7,500 g/mol, 7,000 g/mol, 6,500 g/mol, 6,000 g/mol, 5,500 g/mol, 5,000 g/mol, 4,500 g/mol, 4,000 g/mol, 3,500 g/mol, 3,000 g/mol, 2,500 g/mol, 2,000 g/mol, 1,500 g/mol, 1,250 g/mol, or 1,000 g/mol, or a molecular weight within a range bounded by any two of the foregoing exemplary values. In further embodiments, the precursor lignin, or lignol monomer can have a molecular weight of at least 100 g/mol, 150 g/mol, 180 g/mol, 200 g/mol, 210 g/mol, 250 g/mol, 300 g/mol, 500 g/mol, or 750 g/mol, and an upper molecular weight corresponding to any of the exemplary maximum molecular weights provided above (e.g., 500-3000 g/mol or 500-2000 g/mol).

The precursor lignin can be any of a wide variety of lignin compositions found in nature or as known in the art. As known in the art, there is no uniform lignin composition found in nature. Lignin is a random polymer that shows significant compositional variation between plant species. Many other conditions, such as environmental conditions, age, and method of processing, influence the lignin composition. Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or a range thereof, of any of the H, G, and S components. Typically, the sum of the wt % of each H, G, and S component is 100%, or at least 98% if other minor components are considered. Different wood and plant sources (e.g., hardwood, softwood, switchgrass, and bagasse) often widely differ in their lignin compositions.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfate (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. Any one or more of the foregoing types of lignins may be used (or excluded) as a precursor lignin in the method described herein for producing a crosslinked lignin.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including carbon fiber production and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

In some embodiments, an additional phenolic species (e.g., phenol, resorcinol, or the like), is excluded from the method of producing the crosslinked lignin. In some embodiments, an aldehyde-containing species (e.g., an aldehyde or dialdehyde) other than formaldehyde and glyoxal is excluded from the method of producing the crosslinked lignin. Some examples of such aldehydes or dialdehydes that may be excluded include malondialdehyde, succindialdehyde, glutaraldehyde, and acetaldehyde. In some embodiments, the method includes solely the precursor lignin and either formaldehyde or glyoxal, or a combination thereof, in a suitable solvent, optionally including one or more auxiliary agents necessary or desired for facilitating the reaction (e.g., a catalytic species, pH adjuster, buffer, surfactant, and the like).

Figure 1:
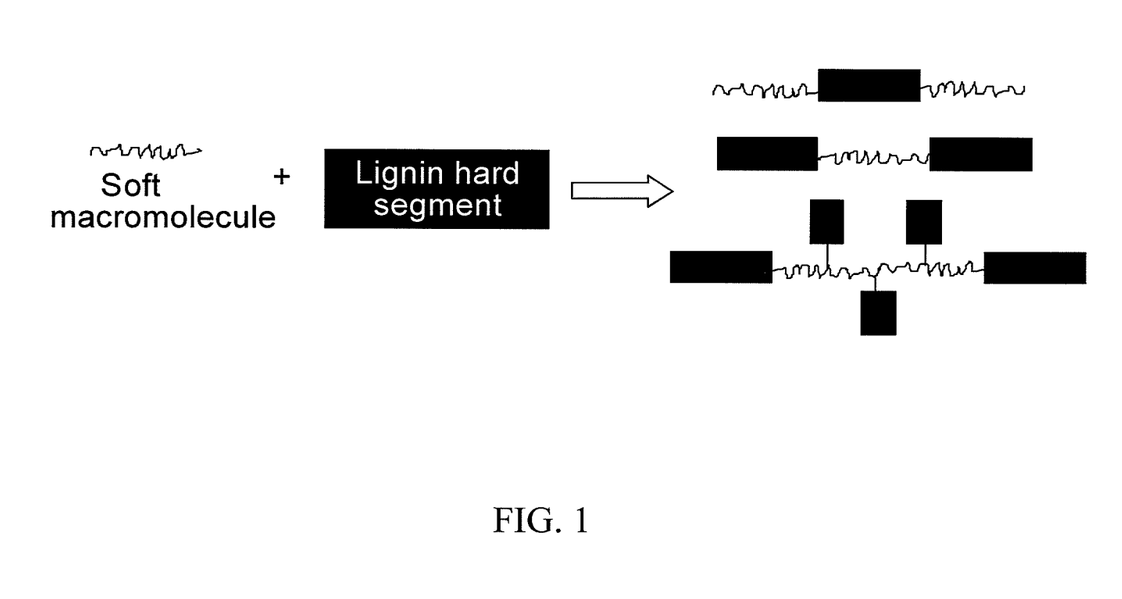
FIG. 1. Some possible structures of lignin-based multiphase copolymers.

In another aspect, the invention is directed to a thermoplastic copolymer that contains the crosslinked lignin described above. The thermoplastic copolymer contains units (i.e., segments) of the above-described crosslinked lignin covalently linked (i.e., copolymerized) with one or more types of thermoplastic polymer units that are not lignin (i.e., non-lignin thermoplastic polymer segments). The resulting copolymer can include terpolymer and tetrapolymer compositions. The copolymer can be, for example, a block, graft, alternating, or random copolymer, or a combination thereof. Depending on the chemistry employed, the crosslinked lignin segments can function as harder or more rigid segments compared to the non-lignin polymer segments, or the crosslinked lignin segments can function as softer or more elastic segments compared to the non-lignin polymer segments. The copolymer is generally characterized by having a two-phase (or higher phase) morphology. Some possible arrangements for the lignin-based multiphase copolymers are shown in FIG. 1.

The non-lignin thermoplastic polymer segments can have any thermoplastic polymer composition known in the art. In some embodiments, the non-lignin thermoplastic polymer segments are saturated (i.e., do not contain carbon-carbon double or triple bonds). In other embodiments, the non-lignin thermoplastic polymer segments are unsaturated by having carbon-carbon double or triple bonds. Natural and synthetic rubbers are particular examples of thermoplastic polymers containing carbon-carbon double bonds. The non-lignin thermoplastic polymer segments may, themselves, be linear or branched polymer segments, or copolymeric segments containing thermoplastic sub-segments therein, wherein the copolymeric segments can be, for example, a block, graft, alternating, or random copolymer, or a combination thereof. In some embodiments, the non-lignin thermoplastic polymer segments are copolymers containing lignin sub-segments (which may be compositionally the same or different from the crosslinked lignin component). In other embodiments, the non-lignin thermoplastic polymer segments do not contain lignin sub-segments.

In different embodiments, the non-lignin thermoplastic polymer segments can have any of a wide range of glass transition temperatures ($T_g$), such as a $T_g$ of precisely, about, at least, above, up to, or less than, for example, $-100°$ C., $-50°$ C., 0° C., 10° C., 20° C., 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., or a $T_g$ within a range bounded by any two of the foregoing exemplary values. The thermoplastic copolymer containing the non-lignin thermoplastic polymer segments and crosslinked lignin segments may also have a $T_g$ selected from any of the exemplary values provided above or within a range bounded by any two of the above exemplary values.

In different embodiments, the non-lignin thermoplastic polymer segments can have any of a wide range of weight-average molecular weights ($M_w$), such as precisely, about, at least, above, up to, or less than, for example, 500,000 g/mol, 400,000 g/mol, 300,000 g/mol, 200,000 g/mol, 100,000 g/mol, 50,000 g/mol, 10,000 g/mol, 5,000 g/mol, 2,500 g/mol, 2,000 g/mol, 1,500 g/mol, 1,000 g/mol, 500 g/mol, or 250 g/mol. The non-lignin thermoplastic polymer segments may also have any of a wide range of number-average molecular weights $M_n$, wherein n can correspond to any of the numbers provided above for $M_w$, as well as, for example, 3, 4, 5, 10, 20, 50, 100, or 200, and wherein the $M_n$ may correspond to any of the $M_w$ values provided above. The molecular weight of the non-lignin thermoplastic polymer segments can also be within a range bounded by any two of the foregoing exemplary values. The thermoplastic copolymer containing the non-lignin thermoplastic polymer segments and crosslinked lignin segments may also have a $M_w$ selected from any of the exemplary values provided above, including $M_w$ values larger than 500,000 g/mol, or within a range bounded by any two of the foregoing exemplary values.

In particular embodiments, the non-lignin thermoplastic polymer segments are derived from monomer units having a chemical structure within the following generic chemical structure:

(1)

In Formula (1), each of $R^1$, $R^2$, $R^3$, $R^4$, $R^5$, and $R^6$ can independently be a hydrogen atom, a saturated or unsaturated hydrocarbon group having 1 to 4 carbon atoms, or a halogen atom. Some examples of saturated hydrocarbon groups having 1 to 4 carbon atoms include methyl, ethyl, n-propyl, isopropyl, n-butyl, sec-butyl, t-butyl, cyclopropyl, and cyclobutyl. Some examples of unsaturated hydrocarbon groups having 1 to 4 carbon atoms include vinyl ($—CH=CH_2$), allyl ($—CH_2—CH=CH_2$), 1-propenyl ($—CH=CH—CH_3$), 3-butenyl ($—CH_2—CH_2—CH=CH_2$), 1,3-butadienyl ($—CH=CH—CH=CH_2$), ethynyl, and 2-propynyl. Halogen atoms include, for example, fluoro, chloro, and bromo atoms.

By being independently selected, $R^1$, $R_2$, $R^3$, $R^4$, $R^5$, and $R^6$ can be independently selected within a monomer unit as well as between monomer units. In some embodiments, a polymer derived from Formula (1) contains monomer units that are unvarying between monomer units with respect to $R^1$, $R^2$, $R^3$, $R^4$, $R^5$, and $R^6$ (i.e., each monomer unit contains the same $R^1$, $R^2$, $R^3$, $R^4$, $R^5$, and $R^6$ groups, although each $R^1$, $R^2$, $R^3$, $R^4$, $R^5$, and $R^6$ is independently selected within a monomer unit, and thus, may or may not be the same within a monomer unit). In other embodiments, a polymer derived from Formula (1) contains monomer units that vary between monomer units with respect to $R^1$, $R^2$, $R^3$, $R^4$, $R^5$, and $R^6$ (i.e., the polymer contains one or more different types of monomer units, thereby being a copolymer). In some embodiments, a copolymer may be derived from monomer precursors of Formula (1) in combination with at least one other type of monomer unit, such as ethylene, a fluoroethylene, an acrylate acid or ester, a methacrylate acid or ester, acrylonitrile, styrene, divinylstyrene, or a combination thereof (e.g., wherein the copolymer is ABS).

In one embodiment, $R^1$, $R^2$, $R^3$, $R^4$, $R^5$, and $R^6$ are all hydrogen atoms, which results in Formula (1) being butadiene, and hence, the non-lignin thermoplastic polymer segments being polybutadiene or a copolymer derived from butadiene and one or more other monomer units, such as ethylene, an acrylate, a methacrylate, a fluoro or chloro ethylene, acrylonitrile, or isoprene. In other embodiments, at least one, two, three, four, five, or all of $R^1$, $R^2$, $R^3$, $R^4$, $R^5$, and $R^6$ are selected from hydrocarbon groups (e.g., methyl groups), or halogen atoms, or a mixture thereof. In particular embodiments, one or both of $R^3$ and $R^4$ are methyl groups, while $R^1$, $R^2$, $R^5$, and $R^6$ are hydrogen atoms. In the case where one of $R^3$ and $R^4$ is a methyl group, Formula (1) corresponds to isoprene, and hence, the non-lignin thermoplastic polymer segments correspond to polyisoprene or a copolymer derived from isoprene and one or more other monomer units, such as ethylene, an acrylate, a methacrylate, a fluoro or chloro ethylene, acrylonitrile, or butadiene.

In other particular embodiments, the non-lignin thermoplastic polymer segments are, or include, alkyleneoxide (polyoxyalkylene) polymer units. The alkyleneoxide polymer units can be any of the alkyleneoxide polymers in the art, such as ethyleneoxide, propylene oxide, or butylene oxide polymers. The alkyleneoxide polymer units may also be a copolymer of, for example, ethyleneoxide and propylene oxide (typically a diblock or triblock copolymer), or a copolymer of an alkyleneoxide and a carboxyl-containing monomer, such as a polyoxyalkylene ester. The copolymer may also be modified by inclusion of a branching moiety, such as ethylene glycol or glycerol molecules, or aliphatic or aromatic dicarboxylic or tricarboxylic molecules. Numerous alkyleneoxide polymers and copolymers are known in the art, all of which are considered herein, unless they significantly undermine desired characteristics of the final thermoplastic polymer, such as the toughness and elasticity requirements for a particular application.

In yet other particular embodiments, the non-lignin thermoplastic polymer segments are, or include, a polymeric structure with a saturated backbone within the following generic chemical structure:

(2)

In Formula (2), $R^7$, $R^8$, $R^9$, and $R^{10}$ are independently selected from hydrogen atom, saturated or unsaturated hydrocarbon groups having 1 to 4 carbon atoms (as defined above for $R^1$, $R^2$, $R^3$, $R^4$, $R^5$, and $R^6$), nitrile, halogen atoms, and groups having formulas —C(O)$R^{11}$, C(O)O$R^{12}$, and —O$R^{13}$, wherein $R^{11}$, $R^{12}$, and $R^{13}$ are selected from hydrogen atom and saturated or unsaturated hydrocarbon groups having 1 to 4 carbon atoms (as defined above). The subscript n can be, for example, at least 2, 3, 4, 5, 10, 20, 30, 40, 50, 100, 200, 300, 400, 500, 1000, 5000, or a value within a range therein. Formula (2) can represent a monomer or copolymer. In some embodiments, $R^7$, $R^8$, $R^9$, and $R^{10}$ are all hydrogen atoms for at least a portion of monomer units. In other embodiments, at least one or two of $R^7$, $R^8$, $R^9$, and $R^{10}$ (for at least a portion of monomer units) are selected from saturated or unsaturated hydrocarbon groups having 1 to 4 carbon atoms, and/or nitrile, and/or halogen atom, and/or a group of the formula —C(O)$R^{11}$, and/or a group of the formula C(O)O$R^{12}$, and/or a group of the formula —O$R^{13}$. In the case where $R^7$, $R^8$, $R^9$ and $R^{10}$ are all hydrogen, the polymer segment corresponds to polyethylene. In the case where $R^7$, $R^8$ and $R^9$ are all hydrogen and $R^{10}$ is a methyl group, the polymer segment corresponds to polypropylene. In some embodiments, when $R^7$ and $R^8$ are hydrogen atoms, and $R^9$ and $R^{10}$ are methyl groups, the polymer segment corresponds to polyisobutylene. In the case where $R^7$, $R^8$ and $R^9$ are all hydrogen and $R^{10}$ is a vinyl group, the polymer segment corresponds to poly(1,2-butadiene). In the case where $R^7$, $R^8$ and $R^9$ are all hydrogen and $R^{10}$ is an ethyl group, the polymer segment corresponds to polybutylene. In the case where $R^7$, $R^8$ and $R^9$ are all hydrogen and $R^{10}$ is a phenyl group, the polymer segment corresponds to polystyrene.

In particular embodiments the soft non-lignin polymer segment is a copolymer of a polymer segment derived from Formula (1) and a polymer segment of Formula (2). For example, when Formula (1) is butadiene (to produce a polybutadiene segment) and Formula (2) is polystyrene, the copolymer segment is styrene-butadiene rubber (SBR). Similarly, in another embodiment, the non-lignin segment is a copolymer of two different polymers of Formula (2), such as a copolymer of ethylene and butylene (i.e., ethylene-butylene copolymer). In yet another embodiment, the soft-segment is a terpolymer from Formula (2), such as a terpolymer of styrene, ethylene, and butylene (i.e., styrene-ethylene-butylene terpolymer).

In still other particular embodiments, the non-lignin thermoplastic polymer segments are, or include, a hydroxy acid structure (e.g., α- or β-hydroxy acid structure), and more particularly, a poly(hydroxyalkanoate) (i.e., "polyhydroxyalkanoate") structure. In particular embodiments, the polyhydroxyalkanoate structure is defined by the following generic chemical structure:

(3)

In Formula (3), $R^{14}$ is selected from a hydrogen atom (H) or hydrocarbon group. The hydrocarbon group for $R^{14}$ includes any of the saturated or unsaturated hydrocarbon groups described above as having one to four carbon atoms, as well as hydrocarbon groups having higher than four carbon atoms, such as five or six carbon atoms. Some examples of hydrocarbon groups having five or six carbon atoms include n-pentyl, isopentyl, cyclopentyl, n-hexyl, isohexyl, cyclohexyl, and phenyl groups. The subscript t is typically an integer from 0 to 3 (i.e., t is typically 0, 1, 2, or 3). The subscript n is typically an integer of at least 5, 10, 20, 50, or 100, 200, 500, 1000, 1500, 2000, 2500, or 5000, or within a range therein. The structure shown by Formula (3) can be a monomer or copolymer. When t is 0, Formula (3) depicts a polymer of an alpha-hydroxy (α-hydroxy) acid. An example of an α-hydroxy polymer when $R^{14}$ is H is polyglycolic acid. An example of an α-hydroxy polymer when $R^{14}$ is methyl is polylactic acid (which may also be poly-L-lactic acid, poly-D-lactic acid, or poly-DL-lactic acid). An example of an α-hydroxy polymer when $R^{14}$ is phenyl is polymandelic acid. When t is 1, Formula (3) depicts a polymer of a beta-hydroxy (β-hydroxy) acid. An example of a 3-hydroxy acid corresponding to $R^{14}$ being H is 3-hydroxypropionic acid. An example of a (β-hydroxy acid corresponding to $R^{14}$ being methyl is β-hydroxybutyric acid, the monomeric unit of polyhydroxybutyrate (i.e., PHB or P3HB). The hydroxy acid need not be within the scope of Formula (3) to be suitable. For example, a polymer of salicylic acid may also be a suitable hydroxy acid polymer.

Copolymers of the hydroxy acids are also considered herein. In some embodiments, two or more different types of hydroxyalkanoates are in the copolymer, such as in (poly (lactic-co-glycolic acid). In other embodiments, the copolymer includes one or more non-hydroxyalkanoate portions, as in poly(glycolide-co-caprolactone) and poly(glycolide-co-trimethylene carbonate).

In different embodiments, the thermoplastic copolymer containing the non-lignin thermoplastic polymer segments and crosslinked lignin segments preferably exhibits an angular shear rate viscosity of at least 500 Pa·s, 600 Pa·s, 700 Pa·s, 800 Pa·s, 900 Pa·s, 1000 Pa·s, 1200 Pa·s, 1500 Pa·s, 5000 Pa·s, 10,000 Pa·s, 25,000 Pa·s, 50,000 Pa·s, 75,000 Pa·s, 100,000 Pa·s, 200,000 Pa·s, 300,000 Pa·s, 400,000 Pa·s, or 500,000 Pa·s at an angular frequency of up to 1000 rad/s at room temperature, or an angular shear rate viscosity within a range bounded by any two of the foregoing exemplary values.

In different embodiments, the thermoplastic copolymer containing the non-lignin thermoplastic polymer segments and crosslinked lignin segments preferably exhibits a shear modulus of at least 1 Pa, 5 Pa, 10 Pa, 50 Pa, 100 Pa, 200 Pa, 300 Pa, 400 Pa, 500 Pa, 600 Pa, 700 Pa, 800 Pa, 900 Pa, 1000 Pa, 1200 Pa, 1500 Pa, 5000 Pa, 10,000 Pa, 50,000 Pa, or 100,000 Pa at an angular frequency of up to 10 rad/s (typically at room temperature), or a shear modulus within a range bounded by any two of the foregoing exemplary values.

In different embodiments, the thermoplastic copolymer containing the non-lignin thermoplastic polymer segments and crosslinked lignin segments preferably exhibits a strength of at least 1 MPa, 5 MPa, 10 MPa, 15 MPa, 20 MPa, 25 MPa,

30 MPa, 40 MPa, 50 MPa, or 100 MPa, or a strength within a range bounded by any two of the foregoing exemplary values.

In different embodiments, the thermoplastic copolymer containing the non-lignin thermoplastic polymer segments and crosslinked lignin segments preferably exhibits an elongation of at least 1%, 2%, 3%, 4%, 5%, 6%, 7%, 8%, 9%, 10%, 12%, 15%, 20%, 50%, or 100%, or an elongation within a range bounded by any two of the foregoing exemplary values.

The amount (i.e., weight percent, or "wt %") of crosslinked lignin in the thermoplastic copolymer can be any suitable amount that produces a desirable set of characteristics in the thermoplastic copolymer. In different embodiments, the crosslinked lignin can be in an amount of precisely, about, at least, up to, or less than, for example, 1 wt %, 2 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, 98 wt %, or 99 wt % by weight of the thermoplastic copolymer. The amount of crosslinked lignin in the thermoplastic copolymer may also be within a range bounded by any two of the exemplary values provided above (for example, 10-60 wt %, 15-60 wt %, 20-60 wt %, 10-50 wt %, 15-50 wt %, or 20-50 wt %).

In another aspect, the invention is directed to a process for preparing the thermoplastic copolymer described above. In the method, a crosslinked lignin, as described above, is reacted with non-lignin thermoplastic polymer segments, as described above, but modified to contain lignin-reactive groups thereon. Generally, at least two lignin-reactive groups are present per each non-lignin thermoplastic polymer segment. The lignin-reactive groups present on the modified non-lignin thermoplastic polymer segments permit the non-lignin thermoplastic polymer segments to covalently bind with the crosslinked lignin. The lignin-reactive groups can be any groups reactive to one or more types of groups that may be present on the crosslinked lignin. The reactive groups can be reactive to, for example, phenol hydroxy groups (as commonly found in lignin), alcoholic groups in general, furanyl groups, or any other groups on the lignin, such as those that may be included by chemical modification. Some examples of lignin-reactive groups include carboxylic acid, carboxylic acid ester, acyl chloride, epoxy, and isocyanate groups. Alternatively, the crosslinked lignin may be suitably derivatized to include groups (e.g., any of the reactive groups described above, including amino or mercapto groups) reactive to groups on a modified or unmodified form of the non-lignin thermoplastic polymer segments.

The chemical modification of non-lignin thermoplastic polymers to include such lignin-reactive groups is well known in the art, and many such derivatized polymers are commercially available (e.g., alkyleneoxide polymers derivatized to contain at least two phenol-reactive groups, such as epoxy, aldehyde, or carboxylic acid ester groups). Notably, some of the non-lignin thermoplastic polymers described herein naturally contain lignin-reactive groups without further modification, e.g., the hydroxy acids, such as the polyhydroxyalkanoates. In particular embodiments, the modified non-lignin thermoplastic polymer is a polybutadiene-containing polymer or copolymer derivatized with carboxy or epoxy groups, particularly those end-capped with carboxy groups, such as a carboxylated or epoxidized polybutadiene polymer of the following structures:

(4)

(5)

The conditions used for linking the non-lignin thermoplastic polymer segments with crosslinked lignin generally include any of the conditions known in the art for facilitating a reaction between any of the common pairs of reactive groups described above. Some of the conditions generally well known in the art include, for example, production of an ester from carboxylic acid and alcohol groups, or a carbamate group from isocyanate and alcohol groups. In some of the reactions, a catalytic species (such as an acid or base) and/or an elevated temperature are used to facilitate the reaction. In some embodiments, the crosslinked lignin and non-lignin thermoplastic polymer segments are reacted under in situ melt mixing conditions to enhance mechanical properties. In other embodiments, the crosslinked lignin and non-lignin thermoplastic polymer segments are reacted under partial free-radical crosslinking conditions. The free radicals are typically generated by decomposition of organic peroxides, such as benzoyl peroxide and dicumyl peroxide. The conditions employed in these and other polymerization techniques are well known in the art. For example, in a melt-mixing process in an internal mixer SBR is pre-mixed with low dosage (0.5 g per hundred g rubber) of organic peroxide, such as dicumyl peroxide at about 60° C. In a second step, the lignin is charged into an empty internal mixer at 180° C. and sheared for 1 minute, and then peroxide pre-mixed SBR is loaded at 50-50 lignin-SBR ratio. When melt-mixed mass was thermally molded for two different compositions, one with peroxide and the other without peroxide, peroxide crosslinked specimens showed 50% higher tensile strength. Depending on the processing conditions, respective peroxide crosslinked formulations showed 0.5 MPa to 5 MPa tensile strength.

In some embodiments, the lignin crosslinking and copolymerization processes are conducted as separate processes. In other embodiments, the lignin crosslinking and copolymerization processes are conducted as a single (i.e., combined, or "one-pot") process, i.e., in a single reaction vessel.

In some embodiments, an additional phenolic species (e.g., phenol, resorcinol, or the like), is excluded from the method of producing the thermoplastic copolymer. In some embodiments, the method includes solely the crosslinked lignin and non-lignin thermoplastic polymer as reactants, typically in a suitable solvent, optionally including one or more auxiliary agents necessary or desired for facilitating the reaction (e.g., a catalytic species, pH adjuster, buffer, surfactant, and the like).

In particular embodiments, lignin segments are copolymerized with polyester molecules to enhance mechanical properties. Transesterification in the presence of an acid catalyst leads to the insertion of more rigid lignin segments into bio-polyester segments, resulting in an increased $T_g$ of the new bio-derived materials. An exemplary transesterification process is shown schematically for the trans-esterification of PHB at primary and secondary alcohol sites of lignin, as follows:

In other particular embodiments, crosslinked lignin is copolymerized with epoxy-functionalized polybutadiene. An exemplary process for epoxidizing polybutadiene and copolymerizing crosslinked lignin with epoxy-functionalized polybutadiene is shown in the following reaction scheme:

In other particular embodiments lignin segments are free-radical grafted onto natural rubber (e.g., latex of the Hevea tree). A low dosage of peroxide initiator, such as benzoyl or dicumyl peroxide, is generally used to produce free radical sites on natural rubber (polyisoprene). The ability of lignin to act as an antioxidant (hindered phenol type) generally permits the efficient coupling of lignin to these free radical sites, typically producing comb-like structures of grafted lignin-latex chains. This route advantageously minimizes the influence of chain termination by lignin impurities (e.g., carbohydrates), allowing synthesis of high molecular weight polymers without intensive lignin purification procedures.

In other aspects, the invention is directed to a process in which the lignin crosslinking process described above is integrated with a lignin-producing process. The process that produces lignin can be, for example, a pulp or paper manufacturing process, or a biorefinery process.

Typically, biorefineries produce ethanol (as a product) and lignin (as a byproduct) from a lignocellulosic biomass source. Some examples of suitable lignocellulosic biomass materials include wood, corn stover, Populus (e.g., poplar, aspen, and/or cottonwood), switchgrass (i.e., Panicum virgatum), miscanthus, sugarcane, paper pulp, and hemp. In a biorefinery, biomass is generally initially pre-treated by boiling, steaming, and/or with dilute acid to loosen cellulose, hemicellulose, and other carbohydrate components in biomass from lignin. This pretreatment process is generally followed by saccharification (i.e., production of sugar, such as glucose, by use of a cellulase enzyme on cellulose), and then fermentation of the sugar by enzymes and/or an ethanologen microbe (e.g., yeast) to produce ethanol. Due to the relatively mild chemical process generally employed in a biomass-to-ethanol biorefinery, the lignin residue emanating from the biorefinery is generally less degraded and more conserved from its natural state, and generally has a higher molecular weight, than that isolated from conventional pulp processing operations, such as the Kraft pulping industry. By being "integrated", the equipment used in crosslinking the lignin (by methods described above) is typically contained within, physically integrated with, and/or physically connected with the equipment used in the lignin-producing operation. For example, the lignin-producing operation may include a lignin precipitation or extraction vessel, from which lignin, after being precipitated or extracted (and optionally, further purified) is transferred by suitable mechanical means to a lignin crosslinking station.

In still other aspects, the invention is directed to an article containing the crosslinked lignin or thermoplastic copolymer described above. The article is typically one in which a significant degree of toughness is desired along with a degree of elasticity. In particular embodiments, the article is in the interior of an automobile (e.g., seat and interior covering), the surface of a piece of furniture, a grip or handle portion of a tool or utensil, or a mat. In other embodiments, the crosslinked lignin or thermoplastic copolymer may be produced and applied as a coating or film, such as a protective film. Numerous other articles may make use of the compositions described herein. The crosslinked lignin may also be incorporated in a formulation as, for example, a thickening, binding, coating, adhesive, or dispersing agent.

Examples have been set forth below for the purpose of illustration and to describe certain specific embodiments of the invention. However, the scope of this invention is not to be in any way limited by the examples set forth herein.

EXAMPLE 1

Controlled Crosslinking of Lignin

The process for crosslinking lignin described in this example can be generally summarized by the following reaction scheme:

A 1-L round-bottomed flask was equipped with a large magnetic stir bar and placed in a heating mantle. 100 g of organosolv lignin (as received, not dried, having a MW of 1840 g/mol, polydispersity index (ratio of weight average to number average molecular weights) of 122, and $T_g$ of 108° C.) were added to the flask. Lignin was dissolved using 200 mL NaOH solution (pH>14) and 300 mL of millipure water, for a final concentration of 16 wt % solids. Once the lignin appeared fully dissolved, the flask was fitted with an addition funnel. 120 mL of formalin solution (10 wt % in buffered solution) were added dropwise to the lignin solution with stirring, at 80° C. After two hours, an additional 120 mL of formalin (10 wt % in buffer solution) were added to the reaction. Reaction continued for four additional hours (six hours total).

The reaction flask was removed from the heating mantle and allowed to cool. The lignin product was precipitated by the bubbling of carbon dioxide through the solution, and isolated by decanting the solvent. The solid product was dried at 40° C. to yield 70 g of material. The dry lignin powder exhibited a MW of 31,000 g/mol, polydispersity index of 20.7, $T_g$>200° C., and complete solubility in N,N-dimethylformamide (DMF). Thus, this pre-crosslinking method not only enhances the molecular weight, but also lowers the polydispersity index without significantly affecting its solubility.

Figure 2:
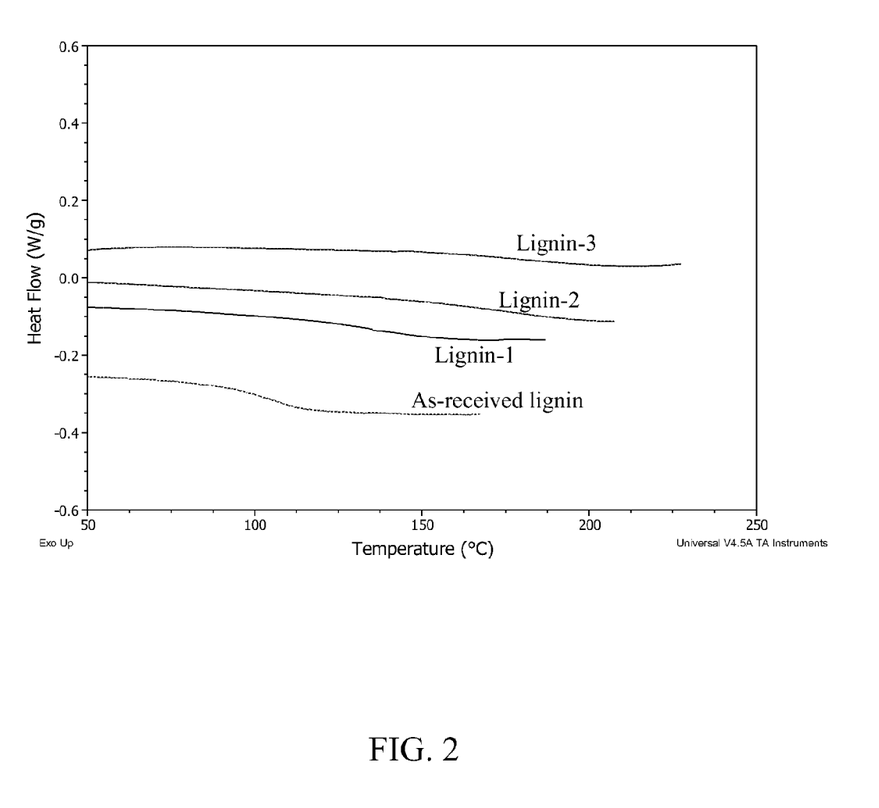
FIG. 2. Differential scanning calorimetry (DSC) traces of as-received lignin and modified, or pre-crosslinked lignin at three different conditions, showing a significant increase in $T_g$.

Through careful tuning of reaction conditions, higher molecular weight lignin fractions were achieved through crosslinking while maintaining solubility in DMF, tetrahydrofuran, and alkaline solution. A significant increase in glass transition temperature ($T_g$) from 107° C. to greater than 160° C. occurred due to changes in lignin structure (FIG. 2). Lignin-1, Lignin-2, and Lignin-3 are the compositions made with 1:4, 1:2, 1:1, formaldehyde to lignin phenolic molar ratios, respectively. With increase in degree of crosslinking introduced by the methylene bridging groups, the lignin polymer's segmental mobility is significantly reduced. This, in turn, enhances the glass transition temperature, or softening point.

EXAMPLE 2

Copolymerization Reactions of Crosslinked Lignin

I. Copolymerization Reaction of Crosslinked Lignin with Carboxy-Functionalized Polybutadiene The process for copolymerizing crosslinked lignin with carboxy-functionalized polybutadiene described in this example can be generally summarized by the following reaction scheme. The long curved lines shown in the final product represent carboxy-functionalized polybutadiene that has been attached to the crosslinked lignin.

As-received lignin was reacted with dicarboxy-terminated polybutadiene soft segment ($M_n$ 4,200 g/mol) in the presence of formalin at 1:1 F/L ratio with KOH in 1,4-dioxane solvent (with KOH concentration of 2.4 mmol/40 mL solvent) for 24 hours at 100° C. Different amounts of lignin were loaded to obtain 9, 13, 17, and 22 wt % lignin, respectively, in the feed compositions. All the resulting lignin-polybutadiene copolymers were isolated via precipitation into methanol and dried under reduced pressure at 50° C. for 18 hours.

II. Results

Figure 3:
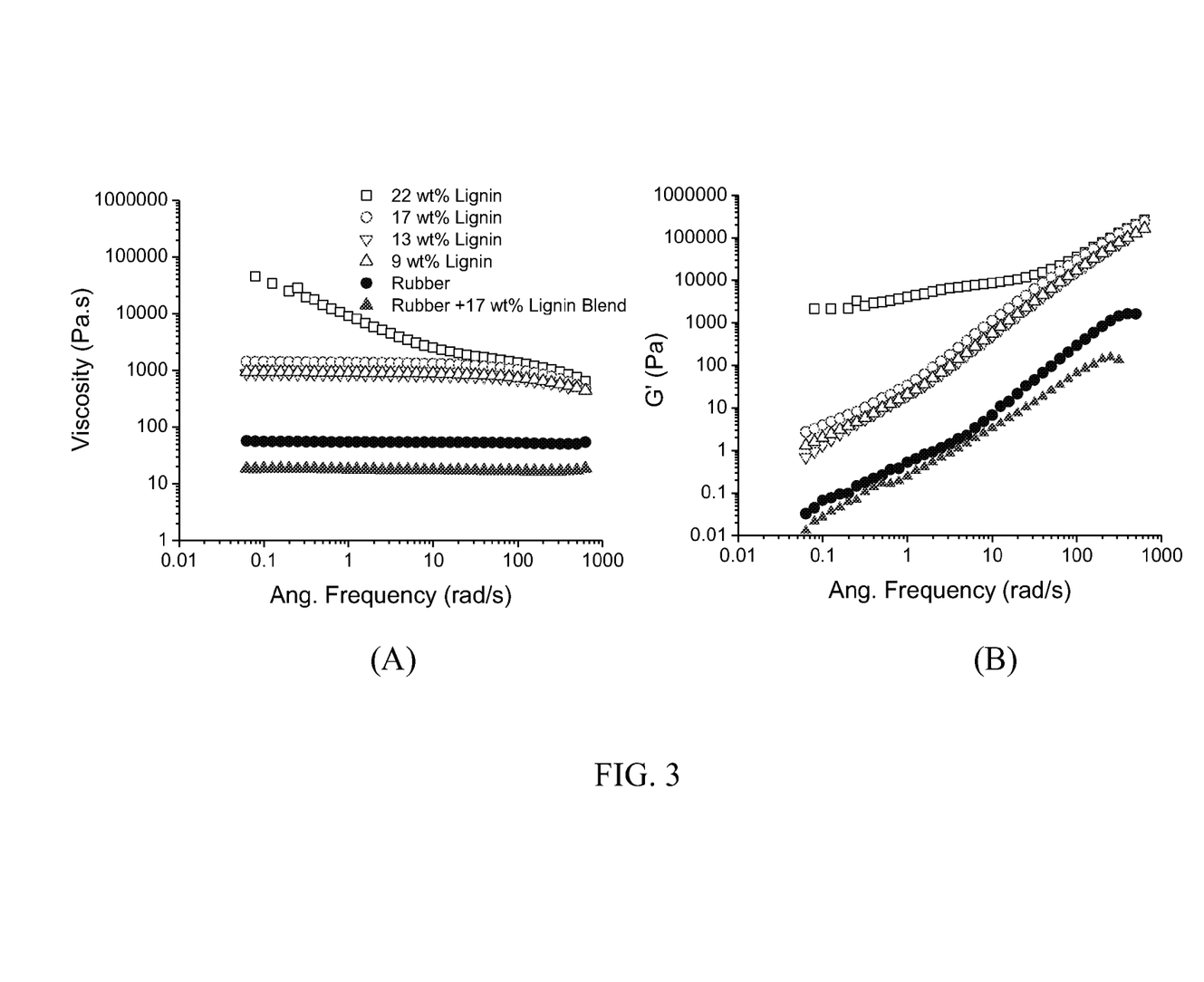
FIGS. 3A, 3B. Viscosity (left, A) and shear modulus (right, B) of lignin-rubber copolymers and controls.

In each case, the synthesized product was a thick, sticky brown solid, a hybrid of the dark brown powder lignin and clear viscous liquid rubber. The dynamic shear viscosity and shear modulus of the lignin-rubber copolymer increased by two orders of magnitude over the neat polymer soft segment or a blend of both components, demonstrating that chemical bonding did occur (FIG. 3). Furthermore, an increase in the amount of lignin incorporated corresponded with an increase in modulus. At the highest lignin content obtained, shear thinning behavior was observed in the synthesized copolymer. It was observed that covalent bond formation between lignin and telechelic polybutadiene caused significant entanglement in the resulting polymer. The entanglement, polymer chain rigidity, and the viscosity increased with increase in lignin content in the copolymer formulations. As shown in FIG. 3(A), the control physical mixture (not processed under reaction conditions) at 17 wt % lignin content showed four times higher viscosity than the liquid rubber. This slight increase in viscosity is due to the incorporation of powdered lignin into the liquid rubber. However, the reacted composition of the same lignin content shows 40 times higher viscosity than the neat rubber, a result that evidences network formation by bonding between lignin and rubber. The formulation with slightly higher lignin content (22 wt %) showed a shear thinning behavior at low angular frequency, a result that indicates that the physical network due to entanglement of the polymers is disrupted by an increase in angular frequency. However, the plateau viscosities at very high angular frequencies are relatively close. The corresponding storage shear moduli of the compositions are displayed in FIG. 3(B). With an increase in frequency, the rubbery materials exhibit strain hardening and higher modulus. However, as the lignin content increases, the modulus also increases. The non-reacted blend does not show significantly enhanced modulus compared to the copolymerized composition.

While there have been shown and described what are at present considered the preferred embodiments of the invention, those skilled in the art may make various changes and modifications which remain within the scope of the invention defined by the appended claims.

What is claimed is:

1. A thermoplastic copolymer, wherein said thermoplastic copolymer has a two-phase morphology and is comprised of crosslinked lignin copolymerized with non-lignin thermoplastic polymer segments, wherein said crosslinked lignin is comprised of a lignin structure having methylene or ethylene linking groups therein crosslinking between phenyl ring carbon atoms, and said crosslinked lignin is crosslinked to an extent that it has a number-average molecular weight of at least 10,000 g/mol, is melt-processable, and has a glass transition temperature of at least 100° C., or is substantially soluble in a polar organic solvent or aqueous alkaline solution.

2. The thermoplastic copolymer of claim 1, wherein said thermoplastic copolymer is a block copolymer or multiphase copolymer.

3. The thermoplastic copolymer of claim 1, wherein said thermoplastic copolymer is a graft copolymer.

4. The thermoplastic copolymer of claim 1, wherein said thermoplastic copolymer has a glass transition temperature selected from a temperature in the range of −100° C. up to 200° C.

5. The thermoplastic copolymer of claim 1, wherein said non-lignin thermoplastic polymer segments contain unsaturated carbon-carbon bonds.

6. The thermoplastic copolymer of claim 5, wherein said non-lignin thermoplastic polymer segments are derived from monomer units having a chemical structure within the following generic chemical structure:

(1)

wherein $R^1$, $R^2$, $R^3$, $R^4$, $R^5$, and $R^6$ are independently selected from hydrogen atom, a saturated or unsaturated hydrocarbon group having 1 to 4 carbon atoms, and halogen atoms.

7. The thermoplastic copolymer of claim 6, wherein said non-lignin thermoplastic polymer segments comprise polyisoprene units.

8. The thermoplastic copolymer of claim 6, wherein said non-lignin thermoplastic polymer segments comprise polybutadiene units.

9. The thermoplastic copolymer of claim 1, wherein said non-lignin thermoplastic polymer segments are alkyleneoxide polymer units.

10. The thermoplastic copolymer of claim 9, wherein said alkylene-oxide polymer units are ethyleneoxide polymer units.

11. The thermoplastic copolymer of claim 1, wherein said non-lignin thermoplastic polymer segments possess a saturated backbone and have a chemical structure within the following generic chemical structure:

(2)

wherein $R^7$, $R^8$, $R^9$, and $R^{10}$ are independently selected from hydrogen atom, saturated or unsaturated hydrocarbon groups having 1 to 4 carbon atoms, nitrile, halogen atoms, and groups having formulas —C(O)$R^{11}$, C(O)O$R^{12}$, and —O$R^{13}$, wherein $R^{11}$, $R^{12}$, and $R^{13}$ are selected from hydrogen atom and saturated or unsaturated hydrocarbon groups having 1 to 4 carbon atoms, and n is an integer of at least 2, and said generic chemical structure can be a monomer or copolymer.

12. The thermoplastic copolymer of claim 1, wherein said non-lignin thermoplastic polymer segments are comprised of a polyhydroxyalkanoate structure within the following generic chemical structure:

(3)

wherein $R^{14}$ is selected from a hydrogen atom or hydrocarbon group, t is an integer from 0 to 3, n is an integer of at least 5, and said generic structure can be a monomer or copolymer.

13. The thermoplastic copolymer of claim 1, wherein said thermoplastic copolymer exhibits an angular shear rate viscosity of at least 500 Pa/s at an angular frequency of up to 1000 rad/s at room temperature.

14. The thermoplastic copolymer of claim 1, wherein said thermoplastic copolymer exhibits an angular shear rate viscosity of at least 1000 Pa/s at an angular frequency of up to 1000 rad/s at room temperature.

15. The thermoplastic copolymer of claim 1, wherein said thermoplastic copolymer exhibits a shear modulus of at least 100 Pa at an angular frequency of up to 10 rad/s.

16. The thermoplastic copolymer of claim 1, wherein said thermoplastic copolymer exhibits a shear modulus of at least 1000 Pa at an angular frequency of up to 10 rad/s.

17. The thermoplastic copolymer of claim 1, wherein said thermoplastic copolymer exhibits a shear modulus of at least 1200 Pa at an angular frequency of up to 10 rad/s.

18. The thermoplastic copolymer of claim 1, wherein said thermoplastic copolymer contains at least 10 weight percent and up to 60 weight percent of said crosslinked lignin.

19. The thermoplastic copolymer of claim 18, wherein said thermoplastic copolymer contains at least 15 weight percent and up to 50 weight percent of said crosslinked lignin.

20. The thermoplastic copolymer of claim 18, wherein said thermoplastic copolymer contains at least 20 weight percent and up to 50 weight percent of said crosslinked lignin.

21. A method for preparing a thermoplastic copolymer, the method comprising reacting a crosslinked lignin with non-lignin thermoplastic polymer segments containing lignin-reactive groups thereon, wherein said crosslinked lignin is comprised of a lignin structure having methylene or ethylene linking groups therein crosslinking between phenyl ring carbon atoms, and said crosslinked lignin is crosslinked to an extent that it has a number-average molecular weight of at least 10,000 g/mol, is melt-processable, and has either a glass transition temperature of at least 100° C., or is substantially soluble in a polar organic solvent or aqueous alkaline solution.

22. The method of claim 21, wherein said lignin-reactive groups are selected from carboxylic acid, carboxylic acid ester, acyl chloride, epoxy, and isocyanate groups.

23. The method of claim 21, wherein said non-lignin thermoplastic polymer segments are derived from monomer units having a chemical structure within the following generic chemical structure:

(1)

wherein $R^1$, $R^2$, $R^3$, $R^4$, $R^5$, and $R^6$ are independently selected from hydrogen atom, a saturated or unsaturated hydrocarbon group having 1 to 4 carbon atoms, and halogen atoms, and wherein each of said non-lignin thermoplastic polymer segments according to formula (1) includes at least two lignin-reactive groups.

24. The method of claim 23, wherein said non-lignin thermoplastic polymer segments are comprised of polyisoprene units.

25. The method of claim 23, wherein said non-lignin thermoplastic polymer segments are comprised of polybutadiene units.

26. The method of claim 21, wherein said non-lignin thermoplastic polymer segments are alkyleneoxide polymer units, each containing at least two phenol-reactive groups.

27. The method of claim 21, wherein said non-lignin thermoplastic polymer segments possess a saturated backbone and have a chemical structure within the following generic chemical structure:

(2)

wherein $R^7$, $R^8$, $R^9$, and $R^{10}$ are independently selected from hydrogen atom, saturated or unsaturated hydrocarbon groups having 1 to 4 carbon atoms, nitrile, halogen atoms, and groups having formulas —C(O)$R^{11}$, C(O)O$R^{12}$, and —O$R^{13}$, wherein $R^{11}$, $R^{12}$, and $R^{13}$ are selected from hydrogen atom and saturated or unsaturated hydrocarbon groups having 1 to 4 carbon atoms, and n is an integer of at least 2, wherein said generic chemical structure can be a monomer or copolymer and includes at least two lignin-reactive groups.

28. The method of claim 21, wherein said non-lignin thermoplastic polymer segments are comprised of polyhydroxyalkanoate structure within the following generic chemical structure:

(3)

wherein $R^{14}$ is selected from a hydrogen atom or hydrocarbon group, t is an integer from 0 to 3, n is an integer of at least 5, and said generic structure can be a monomer or copolymer and includes at least two lignin-reactive groups.

29. The method of claim 21, wherein said thermoplastic copolymer exhibits an angular shear rate viscosity of at least 500 Pa/s at an angular frequency of up to 1000 rad/s at room temperature.

30. The method of claim 21, wherein said thermoplastic copolymer exhibits a shear modulus of at least 100 Pa at an angular frequency of up to 10 rad/s.

31. The method of claim 21, wherein said thermoplastic copolymer contains at least 10 weight percent and up to 50 weight percent of said crosslinked lignin.

32. The method of claim 21, wherein said crosslinked lignin and non-lignin thermoplastic polymer segments are reacted under in situ melt mixing polymerization conditions.

33. The method of claim 21, wherein said crosslinked lignin and non-lignin thermoplastic polymer segments are reacted under free-radical grafting polymerization conditions.

* * * * *